3,318,821
METHOD OF MANUFACTURING A FLUORINE-CONTAINING REFRACTORY INORGANIC OXIDE COMPOSITE
Ernest L. Pollitzer and Vladimir Haensel, Hinsdale, and Herman S. Bloch, Skokie, Ill., assignors to Universal Oil Products Company, Des Plaines, Ill., a corporation of Delaware
No Drawing. Filed Mar. 2, 1966, Ser. No. 531,028
7 Claims. (Cl. 252—442)

This application is a continuation-in-part of our copending application Ser. No. 246,319, filed Dec. 21, 1962, now abandoned.

This invention relates to the manufacture of a hydrocarbon conversion catalyst and particularly to the manufacture of a hydrocarbon conversion catalyst consisting essentially of a fluorine-containing refractory inorganic oxide composite characterized as having a Hammett acidity function value of less than −8.0 that is treated by specific methods of preparation to be hereinafter described in detail.

Halogen containing catalysts and various methods of manufacturing the same have heretofore been suggested. These catalysts, while of wide commercial applicability often have been little used due to their short lives and uncontrollable high activity. The present invention is based upon the discovery that especially high activity catalysts of long useful life may be prepared by specific methods of treatment as hereinafter described.

In one embodiment, the present invention relates to a method for manufacturing a hydrocarbon conversion catalyst which comprises treating at a temperature of between 450° C. to about 700° C. a composite consisting essentially of a fluorine-containing refractory inorganic oxide having oxygen on the surface thereof and characterized as having a Hammett acidity function value of less than −8.0 with a substantially anhydrous oxygen-free gas which is inert to said composite for a time sufficient to remove said oxygen from said composite.

In a more specific embodiment, the present invention relates to a method of manufacturing a hydrocarbon conversion catalyst which comprises treating at a temperature of between 450° C. to about 700° C. a composite consisting essentially of a fluorine-containing silica-alumina having oxygen on the surface thereof and characterized as having a Hammett acidity function value of less than −8.0 with substantially anhydrous hydrogen for a time period of about 5 hours to remove said oxygen from said composite.

Another specific embodiment of the present invention relates to a method for manufacturing a hydrocarbon conversion catalyst which comprises treating at a temperature of between 450° C. to about 700° C. a composite consisting essentially of a fluorine-containing alumina having oxygen on the surface thereof and characterized as having a Hammett acidity function value of less than −8.0 with substantially anhydrous hydrogen for a time period of about 5 hours to remove said oxygen from said composite.

Other embodiments of the present invention will become apparent in considering the specification as hereinafter set forth.

As set forth hereinabove, it has been found that especially good catalysts are prepared in accordance with the novel features of the present invention. It is an object of this invention to produce a catalytic composition of matter possessing a high degree of activity, as well as stability. This high degree of activity renders the catalytic composition of matter especially suitable for use in the chemical and petroleum industries for the purpose of promoting a multitude of reactions including the alkylation of aromatic compounds, the transalkylation of alkylaromatic compounds, the alkylation of isoparaffins, polymerization of olefin-acting compounds, etc. In addition, the catalyst exhibits a high degree of stability, that is, the capability of performing its intended function over an extended period of time, without the necessity for instituting frequent regenerations thereof although the catalyst is regenerable thereby further satisfying the objective of increased economy of operation. This increased activity and stability appear to be due, at least in part, to the resulting physical state of the final catalytic composition of matter, following the use of a substantially anhydrous oxygen-free gas as the treating agent.

In accordance with the present method, a fluorine-containing refractory inorganic oxide composite characterized as having a Hammett acidity function value of less than −8.0 is utilized. The fluorine-containing refractory inorganic oxide composite characterized as having a Hammett acidity function value of less than −8.0 is prepared by methods such as, for example, impregnation with ammonium fluoride; by incorporating the fluoride directly in the dropping sol or precipitation solution as HF; or by impregnation with hydrofluorides of organic bases such as methylammonium fluoride, dimethylammonium fluoride, ethanolamine hydrofluoride, pyridine hydrofluoride, aniline hydrofluoride, trimethylbenzylamine fluoride, etc., followed by appropriate calcination as hereinafter described.

As set forth hereinabove, suitable fluorine-containing refractory inorganic oxide composites are those characterized as having a Hammett acidity function value of less than −8.0. The acid strength of a solid surface is defined as its proton-donating ability, quantitatively expressed by Hammett and Deyrup's $H_0$ function, where $$H_0 = -\log a_{H^+} f_B / f_{BH^+}$$

and where $a_{H^+}$ is the hydrogen ion activity of the surface acid and $f_B$ and $f_{BH^+}$ are activity coefficients of the basic and acid forms, respectively, of the adsorbed indicator. To apply the function $H_0$ as an acid strength index for solid surfaces it is necessary that the ratio $f_B/f_{BH^+}$ for an adsorbed indicator be independent of the indicator used. Hammett indicators utilizable are listed in Table I, together with their color changes and $pK_a$'s. To give some idea of the enormous acid strength range spanned by this bank of indicators, sulfuric acid compositions corresponding to the mid-point of each of the acid-base transitions are also listed. The limits of the $H_0$ of a surface are established by observing the color of the adsorbed form of the Hammett indicators. As examples, a solid having an $H_0$ of −5.6 to −8.2 gives a yellow color with benzalacetophenone and gives no color with anthraquinone; a solid with an $H_0$ less than −8.2 gives acid colors with all Hammett indicators.

Crystal violet is not included with the indicators which Hammett used because its color change is so complex. The basic form of this indicator is violet and the form corresponding to the addition of a single proton is green. However, in more strongly acidic solutions, the indicator undergoes a further color change to yellow. The complexity of these color changes makes it impossible to assign a definite value of $pK_a$ to this indicator. However, it has been found that crystal violet is less basic than the least basic of the Hammett indicators, so that the $pK_a$ of the indicator appears to be less than −8.2. It is to be recalled that the more negative values of $H_0$ represent more acidic surfaces.

TABLE I.—INDICATORS USED FOR ACID STRENGTH DETERMINATIONS*

| Indicator | Color Change | | $pK_a$ | $H_2SO_4$, percent wt. |
|---|---|---|---|---|
| | Basic color | Acid color | | |
| Neutral Red (2-methyl-3-amino-6-dimethylamino-phenazine). | Yellow | Red | +6.8 | $8 \times 10^{-8}$ |
| Phenylazonaphthylamine | ___do___ | Red | +4.0 | $5 \times 10^{-5}$ |
| Butter Yellow (N,N-dimethyl-p-phenylaxoaniline). | ___do___ | Red | +3.3 | $3 \times 10^{-4}$ |
| Benzeneazodiphenylamine | ___do___ | Purple | +1.5 | 0.02 |
| Dicinnamalacetone (1,9-diphenyl-1,3,6,8-nonatetraen-5-one). | ___do___ | Red | −3.0 | 48 |
| Benzalacetophenone | Colorless | Yellow | −5.6 | 71 |
| Anthraquinone | ___do___ | ___do___ | −8.2 | 90 |
| Crystal Violet | Violet-Green. | ___do___ | <−8.2 | >90 |

*Much of this table and the preceding discussion of the $H_0$ function is based on J. Am. Chem. Soc. 78, 5490–5494 (1956).

Suitable fluorine-containing refractory inorganic oxide composites characterized as having a Hammett acidity function value of less than −8.0 include silica (a non-metallic refractory oxide), and various refractory metal oxides such as alumina, silica-alumina, silica-alumina-magnesia, silica-magnesia, silica-zirconia, alumina-zirconia, alumina-boria, zirconium dioxide, titanium dioxide, etc. The fluorine-containing refractory inorganic oxide may be further characterized as having a high surface area. By the term high surface area is meant a surface area measured by surface adsorption techniques within the range of from about 25 to about 500 or more square meters per gram and preferably a refractory inorganic oxide having a surface area of approximately 100 to 300 square meters per gram. Particularly preferred supports for the preparation of catalysts manufactured utilizing the method of this invention include high surface area crystalline alumina modifications such as gamma-, eta- and theta-alumina, although these are not necessarily of equivalent suitability.

Although the method of the present invention is applicable to the manufacture of a variety of fluorine-containing refractory inorganic oxides as hereinbefore set forth, in the interest of simplicity and brevity, the following discussion is limited to the manufacture of alumina, and particularly alumina to be subsequently employed as the carrier material in the manufacture of catalytically active composites. It is understood, however, that the method of the present invention may be utilized to advantage in the preparation of fluorine-containing refractory inorganic oxides whether alumina, alumina-silica, silica, or other fluorine-containing refractory inorganic oxides characterized as having a Hammett acidity function value of less than −8.0 as hereinbefore set forth, either alone, or in combination with the alumina and/or silica. In the present specification, as well as the appended claims, the term "alumina" is employed to mean aluminum oxide in any state of oxidation or hydration, as well as aluminum hydroxide. The alumina may be either synthetically prepared, or naturally occurring, or of the crystalline or gel type.

The alumina, to be improved through the utilization of the method of the present invention, may be manufactured in accordance with any of the well-known suitable methods of manufacture, none of which is considered uniquely essential to the present invention. Alumina may be prepared, for example, by adding a suitable alkaline reagent such as ammonium hydroxide to a soluble salt of aluminum, such as the chloride, the sulfate, the nitrate, etc., in an amount to form aluminum hydroxide which, upon drying and calcining, is converted to alumina. Other refractory inorganic oxides, particularly silica, may be added to the alumina in any suitable manner including separate, successive or coprecipitation means. Although alumina is manufactured in a variety of shapes, such as pills, granules, cakes, spheres, extrudates, etc. a preferred form of alumina is the sphere. When in the form of spheres, the alumina may be continuously manufactured by the oil-drop method which consists of passing droplets of a suitable aluminum-containing hydrosol into an oil bath maintained at an elevated temperature and retaining the droplets within said oil bath until they are set to firm hydrogel spheroids. The spheroids are continuously withdrawn from the oil bath and immediately thereafter subjected to particular aging treatments for the purpose of imparting thereto the desired physical characteristics. It is not essential to the method of the present invention that the alumina be prepared in any particular manner, nor that the alumina exist in any special physical shape; the methods of preparation, and the various forms of alumina hereinabove set forth, are intended to be illustrative rather than restrictive upon the present invention.

As set forth hereinabove, the catalyst consists essentially of a fluorine-containing refractory inorganic oxide composite characterized as having a Hammet acidity function value of less than −8.0 that is treated by specific methods of preparation. The amount of fluorine that may be contained by the composite will range from about 2% or lower to about 12% or higher based upon the weight of the refractory inorganic oxide although concentrations corresponding from about 6.0 to about 10.0% fluorine by weight are especially preferred to be composited with the refractory inorganic oxide initially.

The essential feature of the present invention is the utilization of a substantially anhydrous oxygen-free gas as the treating agent. The fluorine-containing refractory inorganic oxide composite having a Hammett acidity function value of less than −8.0 is treated at a temperature in the range of from about 450° C. to about 700° C. or higher in the presence of the substantially anhydrous oxygen-free gas thereby yielding a final catalytic composition of matter. A preferred final catalytic composition of matter contains from about 2.0 to about 8.0% by weight of fluoride. This preconditioning step in the presence of an oxygen-free gas has been found necessary in order to prevent instantaneous deactivation of the catalytic sites of the catalyst. It is now known that after calcination or other exposure to air there is a layer of oxygen strongly adsorbed on the catalyst surface, namely the fluorine-containing refractory inorganic oxide, and that to displace it for activation of the hereinbefore mentioned catalytic sites the utilization of a substantially anhydrous oxygen-free gas is necessary. In this manner, the oxygen on the catalyst surface is removed so that the reaction of the bound oxygen with hydrocarbons is avoided and instantaneous deactivation by condensation of carbonaceous materials is therefore avoided. Typical substantially anhydrous oxygen-free gases for use in this invention include nitrogen, hydrogen, helium, neon, argon, krypton and xenon. Especially preferred substantially anhydrous oxygen-free gases include nitrogen and hydrogen. These treating gases do not have an adverse effect upon the resultant catalyst activity but only a beneficial effect. Furthermore, as will be demonstrated in the examples, this treating step results in catalytic compositions of matter of unexpectedly high activity for certain hydrocarbon conversion reactions.

Prior art investigators have utilized hydrogen as a reducing agent when a catalytic composite contains some component to be reduced by the action of hydrogen. One catalytic composite consists essentially of a fluorine-containing inorganic oxide or oxides. In effect, our treating gas, whether it is hydrogen or nitrogen or one of the treating gases set forth hereinabove, is inert with respect to our catalyst and is used for an entirely different purpose than to reduce a platinum component or other reducible component of a catalyst. Further, when a platinum-containing catalyst is reduced, water is formed. Water, of course, contains oxygen and thus prior art reducing procedures are clearly different from our treatment of the catalytic composite with an oxygen-free gas that is inert with respect to the composite. In contradistinction to the prior art, it has also been found that a treated chlorine-containing refractory inorganic oxide catalytic composition of matter is from about ½ to about ⅓ as active and substantially less stable than the treated fluorine-containing refractory inorganic oxide composite thereby showing the non-equivalency of treated fluorine- and treated chlorine-containing refractory inorganic oxide composites which are prepared according to the process of the present invention.

The length of the treating step with the substantially anhydrous oxygen-free gas, as well as the total quantity of substantially anhydrous oxygen-free gas which is passed through the fluorine-containing inorganic oxide in contacting the same, is depedent upon the quantity of the material to be so treated, the means employed to disperse the substantially anhydrous oxygen-free gas throughout the refractory material, and other similar variables. A time period of about 5 hours has been found to be sufficient to remove oxygen from the surface of the catalyst. The substantially anhydrous oxygen-free gas will contain water in an amount less than about 0.5 mol percent and preferably less than about 0.1 mol percent in order to effect the method of the present invention.

It has also been found that high temperature calcination in an atmosphere of air at a temperature in excess of about 400° C. prior to treating the fluorine-containing refractory inorganic oxide composite in the presence of a substantially anhydrous oxygen-free gas may be utilized, if necessary, to economically dry the fluorine-containing refractory inorganic oxide composite. In this manner, the substantially anhydrous oxygen-free gas it not used wastefully as a drying agent, although it readily could be used as such, and it is conserved for the activation of the catalyst. Further, when organic bases such as those hereinbefore mentioned are used as the fluorinating agent, the calcination step may be utilized to remove the organic material and may be followed by the treating step with the oxygen-free gas. The treating step is essential as hereinbefore set forth to activate the catalytic sites of the refractory inorganic oxide and to prevent instantaneous deactivation of the desired final catalytic composition of matter.

As hereinbefore stated, the particular means by which the fluorine-containing refractory inorganic oxide is prepared is not limiting upon the method of the present invention. The following description of a specific embodiment, involving the manufacture of alumina spheres is understood to be solely for the purpose of illustration. It is further understood that the broad scope of the present invention is not intended to be unduly limited thereby, and that the present invention affords exceptional benefits to the manufacture of a multitude of fluorine-containing refractory inorganic oxides characterized as having a Hammett acidity function value of less than −8.0, a representative number of which have been previously described.

The alumina spheres are placed in a suitable vessel in which they are disposed while the various procedures described are being effected. The treating step is readily carried out by causing the substantially anhydrous oxygen-free inert gas to pass through the vessel either upflow, downflow, or crossflow. In some instances, the fluorine-containing alumina spheres may be placed on a moving belt, and the gaseous material caused to pass over, under and through the spheres while the latter are disposed on the belt. It is preferred to have the fluorine-containing alumina spheres, or other shaped particles, disposed within an enclosed vessel, wherein the gaseous material is passed downwardly through the particles.

As hereinbefore set forth, and hereinafter illustrated in greater detail, the method of the present invention as briefly described above, results in final catalytic compositions of matter which are possessed of high activity and stability in certain hydrocarbon conversion reactions. The following examples are introduced to further illustrate the utility of the present invention, and to indicate the benefits afforded through the use thereof. They are not intended to limit the invention to the specific material, conditions and/or concentrations involved therein. The catalytically active carrier material employed in the examples was prepared by the oil-drop method hereinbefore described.

EXAMPLE I

A fluorine-containing refractory inorganic oxide composite was prepared by impregnating alumina with ammonium fluoride. The resultant fluorine-containing alumina was tested for acid strength using the crystal violet Hammett indicator. The Hammett indicator changed from violet to yellow indicating a Hammett acidity function value of less than −8.2. The resultant fluorine-containing refractory inorganic oxide composite having a Hammett acidity function value of less than −8.0 was treated at a temperature of about 550° C. for about 5 hours in the presence of substantially anhydrous nitrogen containing less than about 0.1 mol percent water. The finished catalyst was found to contain about 5.5% fluoride, and had a surface area, as measured by nitrogen adsorption, of 200 square meters per gram. The catalyst was designated as catalyst "A."

EXAMPLE II

Another catalyst was prepared by impregnating a high surface area alumina with ammonium fluoride. The resultant fluorine-containing high surface area (190 square meters per gram) alumina was tested for acid strength using the crystal violet Hammett indicator. The Hammett indicator changed from violet to yellow indicating a Hammett acidity function value of less than −8.2. The resultant fluorine-containing refractory inorganic oxide characterized as having a Hammett acidity function value of less than −8.0 was subjected to a high temperature calcination in an atmosphere of air at a temperature in excess of 400° C. prior to treating. The composite was then treated at a temperature of about 550° C. for about 5 hours in the presence of substantially anhydrous hydrogen containing less than about 0.1 mol percent water. The finished catalyst was found to contain about 5.5% fluoride. This catalyst was designated as catalyst "B."

EXAMPLE III

Yet another catalyst was prepared by impregnating high surface area alumina spheres with ammonium fluoride. The resultant fluorine-containing composite was dried to remove excess water by high temperature calcination in an atmosphere of air at a temperature in excess of 400° C. prior to treating. The composite was tested for acid strength using the crystal violet Hammett indicator which indicated a Hammett acidity function value of less than −8.2 as evidenced by the change in color from violet to yellow. The composite was then treated at a temperature of about 550° C. for about 5 hours in the presence of substantially anhydrous nitrogen containing less than about 0.1 mol percent water. The finished catalyst was found to contain about 5.5% fluoride. This catalyst was designated as catalyst "C."

EXAMPLE IV

In this example, alumina spheres of the same type as used in the preceding examples were impregnated with ammonium fluoride. The resultant fluorine-containing composite was subjected to high temperature calcination in air at a temperature in excess of 400° C. prior to treating. The Hammett acidity function value again was found to be less than −8.2 as evidenced by the color change of the crystal violet Hammett indicator. The high temperature calcined fluorine-containing alumina composite was then treated at a temperature of about 550° C. for about 5 hours in the presence of substantially anhydrous air containing less than about 0.1 mol percent water. The finished catalyst was found to contain about 5.5% fluoride. This catalyst was designated as catalyst "D."

EXAMPLE V

Another catalyst was prepared by impregnating silica-alumina of surface area 250 square meters per gram with ammonium fluoride. The resultant fluorine-containing composite was tested for acid strength using the crystal violet Hammett indicator. The Hammett indicator changed from violet to yellow indicating a Hammett acidity function value of less than −8.2. The resultant fluorine-containing refractory inorganic oxide composite now characterized as having a Hammett acidity function value of less than −8.0 was treated at a temperature of about 550° C. for about 5 hours in the presence of substantially anhydrous hydrogen containing less than about 0.1 mol percent water. The finished catalyst was found to contain about 5.5% fluoride. This catalyst was designated as catalyst "E."

EXAMPLE VI

The catalyst prepared according to Example I above and designated as catalyst "A" was utilized in a transalkylation reaction to determine the transalkylation activity of said catalyst. In this experiment, 75 cc. of the catalyst prepared according to Example I was placed in an appropriate apparatus which was provided with heating means. In the experiment, a mixture of 86.8 weight percent benzene and 13.2 percent diisopropylbenzene was continuously passed through the transalkylation reactor. The reactor was maintained at about 1000 p.s.i.g. and about 235° C. Based on weight, substantially equilibrium conversion of the diisopropylbenzene to cumene was obtained during the entire experiment, which extended over more than 100 hours. The product was analyzed using gas-liquid chromatography and it was found that the product comprised 20.2% cumene, 1.0% diisopropylbenzene, 1.3% intermediate and heavy materials, and 77.5% benzene.

EXAMPLE VII

The catalyst prepared according to the method set forth in Example II above and designated as catalyst "B" was also utilized in a transalkylation reactor, the conditions and apparatus being similar to that described in Example VI above. Based on weight, substantially equilibrium conversion of the diisopropylbenzene was obtained. The product was analyzed using gas-liquid chromatography and it was found thta for a substantial portion of the experiment, the product comprised from about 18.7 to about 21.5% cumene with less than 1.0% diisopropylbenzene remaining.

EXAMPLE VIII

The catalyst prepared according to Example III and designated as catalyst "C" was utilized in a transalkylation reaction, 75 cc. of the finished catalyst having been placed in the transalkylation apparatus. In the experiment, benzene and diisopropylbenzene were charged to the transalkylation zone and once again substantially complete conversion of the diisopropylbenzene was obtained in that 16.8 to about 19.6 weight percent cumene was obtained.

EXAMPLE IX

In this example, the catalyst prepared according to Example IV and designated as catalyst "D" was utilized in the transalkylation of diisopropylbenzene to determine the activity of said catalyst. In this experiment, 75 cc. of catalyst was placed in the same apparatus used previously. The 86.8% benzene-13.2% diisopropylbenzene mixture again was charged to the transalkylation reactor. The reaction was maintained at about 1000 p.s.i.g. and about 235° C. Based on weight, only from about 0.5 to about 1.1% of the product comprised cumene. The remainder of the diisopropylbenzene did not react with the benzene to form cumene. This example clearly shows the effect of omission of the catalyst treatment step—that is, treatment with a substantially anhydrous oxygen-free inert gas since an inactive final catalytic composition of matter was obtained when the catalyst was treated with substantially anhydrous air.

EXAMPLE X

In this example, the catalyst prepared according to Example V and designated as catalyst "E" was utilized in the transalkyltaion of diisopropylbenzene with benzene. In the experiment, benzene and diisopropylbenzene were charged to the transalkylation zone and once again substantially equilibrium conversion of the diisopropylbenzene was obtained in that about 18.8 to about 19.2 weight percent cumene was obtained with less than about 1.5 weight percent diisopropylbenzene remaining.

The foregoing specification and examples clearly illustrate the method of the present invention and the benefits to be afforded through the utilization thereof.

We claim as our invention:

1. A method for manufacturing a hydrocarbon conversion catalyst which comprises treating at a temperature of between 450° C. to about 700° C. a composite consisting essentially of a fluorine-containing refractory inorganic oxide free of reducible components and having oxygen on the surface thereof and characterized as having a Hammett acidity function value of less than −8.0 with a substantially anhydrous oxygen-free gas which is inert to all components of said composite for a time sufficient to remove said oxygen from said composite.

2. The method of manufacturing a hydrocarbon conversion catalyst as set forth in claim 1 further characterized in that said composite is subjected to a high tempertaure calcination in an atmosphere of air at a temperature in excess of about 400° C. prior to said treating in the presence of the substantially anhydrous oxygen-free gas.

3. The method of manufacturing a hydrocarbon conversion catalyst as set forth in claim 1 further characterized in that said time sufficient to remove said oxygen from said composite is a time period of about 5 hours.

4. The method of claim 1 further characterized in that said inorganic oxide is silica-alumina.

5. The method of claim 1 further characterized in that said inorganic oxide is alumina.

6. The method of claim 1 further characterized in that said substantially anhydrous oxygen-free gas is hydrogen.

7. The method of claim 1 further characterized in that said substantially anhydrous oxygen-free gas is nitrogen.

References Cited by the Examiner

UNITED STATES PATENTS

| | | | |
|---|---|---|---|
| 2,863,824 | 12/1958 | Grosse et al. | 252—441 X |
| 2,914,485 | 11/1959 | Keith | 252—441 X |
| 2,952,715 | 9/1960 | Donaldson et al. | 252—441 X |
| 3,121,696 | 2/1964 | Hoekstra | 252—441 X |
| 3,123,573 | 3/1964 | Carr | 252—441 X |
| 3,166,542 | 1/1965 | Orzechowski et al. | 252—441 X |

DANIEL E. WYMAN, *Primary Examiner.*

EDWARD STERN, *Examiner.*

L. G. XIARHOS, *Assistant Examiner.*